US008650651B2

(12) United States Patent
Podjarny et al.

(10) Patent No.: US 8,650,651 B2
(45) Date of Patent: Feb. 11, 2014

(54) METHOD AND APPARATUS FOR SECURITY ASSESSMENT OF A COMPUTING PLATFORM

(75) Inventors: Guy Podjarny, Ottawa (CA); Ory Segal, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 12/028,187

(22) Filed: Feb. 8, 2008

(65) Prior Publication Data
US 2009/0205047 A1 Aug. 13, 2009

(51) Int. Cl.
G06F 11/00 (2006.01)
G06F 12/14 (2006.01)
G06F 12/16 (2006.01)
G08B 23/00 (2006.01)

(52) U.S. Cl.
USPC ................ 726/25; 726/22; 709/224

(58) Field of Classification Search
USPC ..................... 726/22, 25; 709/224
See application file for complete search history.

(56) References Cited

U.S. PATENT DOCUMENTS

| 7,712,137 | B2 * | 5/2010 | Meier ........................ 726/25 |
| 7,774,637 | B1 * | 8/2010 | Beddoe et al. ........... 714/38.1 |
| 8,095,982 | B1 * | 1/2012 | Guruswamy ............... 726/25 |
| 8,095,983 | B2 * | 1/2012 | Guruswamy ............... 726/25 |
| 2001/0034847 | A1 * | 10/2001 | Gaul, Jr. .................. 713/201 |
| 2002/0032766 | A1 * | 3/2002 | Xu .......................... 709/223 |
| 2006/0085852 | A1 * | 4/2006 | Sima ......................... 726/22 |
| 2008/0263671 | A1 * | 10/2008 | Solino Testa et al. ...... 726/25 |

* cited by examiner

*Primary Examiner* — Ashok Patel
*Assistant Examiner* — Daniel Potratz
(74) *Attorney, Agent, or Firm* — Holland & Knight LLP; Brian J Colandreo, Esq.; Jeffrey T Placker, Esq.

(57) ABSTRACT

A system and method for automated security testing are disclosed. The disclosure provides for automated discovery of security vulnerabilities through the monitoring of activities that occur throughout the separate components of a computing platform during a testing session through a communications interface.

25 Claims, 6 Drawing Sheets

Black box testing

Gray box testing

Front End Component

Back End Component

Black Box Testing Example

Gray Box Testing Example

METHOD AND APPARATUS FOR SECURITY ASSESSMENT OF A COMPUTING PLATFORM

FIELD OF INVENTION

This invention relates generally to software security, and more specifically to assessing security vulnerabilities of a computing platform.

BACKGROUND

Software testing is the process used to help identify the correctness, completeness, security, and/or quality of developed computer software and computer systems. Software testing is typically used in association with verification and validation. Verification is the checking of or testing of items, including software, for conformance and consistency with an associated specification and validation is the process of checking what has been specified is what the user actually wanted.

Black box testing is a method of software testing used when the tester has substantially no knowledge of the internal structure of the software application. The tester can select certain valid and invalid input to enter into the application and subsequently can determine whether the output is the correct result. The tester will typically not know why the output is the correct result or not, but will know whether the application will function as it was intended.

Another testing method is white box testing, wherein a tester uses an internal perspective of the system to design test cases based on internal structure. This testing method can require programming skills to identify substantially all paths through the software. The tester can choose test case inputs to exercise different paths through the code and determine the appropriate outputs. The following are examples of different types of software testing applications.

Canadian Patent Application No. 2,297,994 allows a tester to enter a "test request" through a graphical user interface (GUI). By entering a specific test request the user is selecting what test data is to be used from a collection of test data in that specific testing scenario.

U.S. patent application Ser. No. 11/438,961 provides an approach to testing applications for vulnerabilities at the networking level that may be as a result of loosely defined criteria and restrictions associated with the interfacing between applications, for example, the Hypertext Transfer Protocol (HTTP) interface.

U.S. patent application Ser. No. 11/226,959 provides a system for automated testing of application programs using a GUI. A user can automatically create test cases in comma-separated values (CSV) format, and execute the test data using a suitable GUI, such as Rational Functional Tester (RFT) or IBM/Tivoli Identity Manager (ITIM), which can perform functional, easily executable tests on the software applications.

U.S. patent application Ser. No. 10/050,675 describes a system and method for testing the vulnerabilities of a target computer network through a target computer by sending intrusive commands through specified ports using Transmission Control Protocol/Internet Protocol (TCP/IP) packets. The system can identify open ports that are left vulnerable to attack by routers, switches, firewalls, and other network devices or applications.

Automated web application security scanning is currently provided through the HTTP interface web server and web application. The testing that is accomplished through this method is considered to be black box testing. Black box testing is generally limited to defined interfaces, such as HTTP interfaces, whereby testing results provided by this method are generally limited to information accessible through such interfaces in combination with previously known information about the tested application. This testing format can therefore limit a security assessment of the application by restricting the amount and type of vulnerability information that is exposed through the HTTP interface. Under certain circumstances, some security vulnerabilities may exist which are not realized or identifiable through the HTTP interface. Scanners available on the market today have limited understanding of the architecture of a software application and the back end components. Having an understanding of the process flow and the activities that occur during an HTTP interface based interaction within all the applications, would provide the tester with more information which can be used when selecting which tests to send on which parts of the application instead of merely trying all options on all parts of the application.

There is therefore a need for a new system and method for the security assessment of a computing platform which can provide a desired level of assessment thereof.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the invention is to provide a method and apparatus for security assessment of a computing platform. In accordance with an aspect of the invention, there is provided a system for detecting security vulnerabilities in a computing platform, said computing platform comprising one or more front end components which provide services to other applications or users, and one or more back end components which supply required information to said one or more front end components to fulfill said services, said system comprising: one or more first monitoring modules communicatively linked to said one or more front end components, and operatively configured to monitor said one or more front end components while communicating data with said one or more front end components; one or more second monitoring modules communicatively linked to said one or more back end components, and operatively configured to monitor said one or more back end components while said one or more back end components supply required information to said one or more front end components; wherein said one or more first monitoring modules communicate data with said one or more front end components and monitors the activities of said one or more front end components, while said one or more second monitoring modules monitor the activities of said one or more back end components; and wherein the resulting activity information extracted may be combined to contribute to identification of one or more security vulnerabilities within said computing platform.

In accordance with another aspect of the invention, there is provided a method of detecting security vulnerabilities in a computing platform, said computing platform comprising one or more front end components which provide services to other applications or users, and one or more back end components which supply required information to said one or more front end components to fulfill said services, said method comprising: connecting to said one or more front end components using one or more front end communication protocol connections; connecting to said one or more back end components using one or more application-specific protocol connections for communicating with an application; communicating data with said one or more front end components; monitoring activities of said one or more front end components while communicating said data; monitoring activities of said one or more back end components; extracting activity information from said one or more front end components and from said one or more back end components; and storing said activity information.

In accordance with another aspect of the invention, there is provided a computer readable medium having recorded thereon statements and instructions for execution by a computer for detecting security vulnerabilities in a computing platform, the computing platform comprising one or more front end components which provide services to other applications or users, and one or more back end components which supply required information to the one or more front end components to fulfill the services, by carrying out the steps of: connecting to said one or more front end components; connecting to said one or more back end components; communicating data with said one or more front end components; monitoring activities of said one or more front end components while communicating data therewith; monitoring activities of said one or more back end components; extracting activity information from said one or more front end components and from said one or more back end components; and storing said activity information.

DETAILED DESCRIPTION OF THE INVENTION

Definitions

Figure 1A:
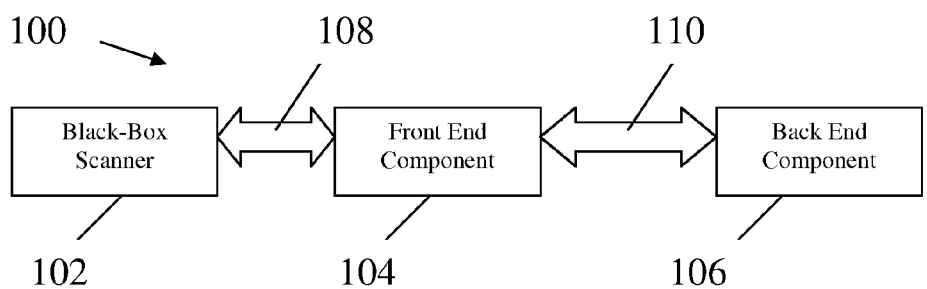
FIG. 1A is a high level diagrammatic representation of a system for detecting security vulnerabilities in a computing platform, wherein the system is performing a black box test.

The term "computer readable medium" is used to define a type of computer data storage or computer memory, such as, but not limited to CD, RAM, EPROM, EEPROM, ROM, DVD, optical or magnetic drives, etc., or other computer readable media as would be readily understood by a worker skilled in the art.

The term "computing device" is used to define an electronic device with storage and computing capability and a communication means with which to communicate with one or more other computing devices or peripheral devices. Computing devices may include but are not limited to computers, laptops, cell phones, gaming consoles, handheld gaming devices, wireless devices, and personal digital assistants or the like. The communication means would be understood by a worker skilled in the art to include necessary elements of hardware, including but not limited to communications ports, wireless transmitter/receivers, wires or fibre optics; and software, including but not limited to telephony, email, facsimile, Bluetooth®, TCP/IP, FTP, XML, and IRC, etc. that allow a computing device to exchange data packets with another computing device or peripheral device.

As used herein, the term "about" refers to a +/−10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this invention belongs.

Security testing is a type of black box testing, as described above, of an information system. As is known, during black box testing, the results of a security assessment are limited by the information provided through the HTTP interface by the server, possibly combined with previously known information about the tested application (e.g. logical or technical knowledge of the application associated with previously tested functions, etc.). For example, the only information available through these HTTP interfaces can be the input, the output, and the time it took to provide the output. From this information a tester must determine whether a vulnerability exists somewhere in the system. The present invention allows for automated discovery of security vulnerabilities that are not exposed through the defined interfaces used for black box testing, such as a Hypertext Transfer Protocol (HTTP) interface.

The present invention provides a method and apparatus for looking behind the defined interfaces, such as an HTTP interface, while a black box test is running. The apparatus for security assessment according to one embodiment of the invention comprises a monitoring module which connects to the front end component through a common communications protocol, for example the Hypertext Transfer Protocol, and also connects to the front end component through a separate protocol (e.g. other than a Hypertext Transfer Protocol), for example through a file system access, while also directly connecting to the back end component through a server specific communications protocol. The monitoring module can send requests to and/or receive responses or data from the front end component through the communication protocol, while monitoring the activities of both the front end and the back end components during the communication. The information received regarding the activities of the components during these communications can be stored by the monitoring module and used in determining whether there are security vulnerabilities within the system. The resulting information can also be used by the tester in combination to determine what parts of the system are involved in the vulnerabilities.

FIG. 1A illustrates an example of black box testing of a computing system. During black box test of a computing system 100, a black-box scanner 102 connects to a front end component 104 through a defined connection interface 108, such as, but not limited to, an HTTP interface. The HTTP interface is a method used to transfer or convey information between clients and servers as would be known to a person of ordinary skill in the art, (e.g. the black-box scanner being the client and the front end component being the server). The front end component 104 connects to the back end component 106 through an application specific communication protocol 110, such as, but not limited to the Open Database Connectivity (ODBC) protocol, .NET protocol, Java Database Connectivity (JDBC) Application Programming Interface (API) or other as would be readily understood by a worker skilled in the art. During the testing, the black-box scanner 102 sends a request, for example, an HTTP request, to the front end component 104. The front end component 104 executes the request. While executing the request, the front end component 104 may need to contact the back end component 106 to retrieve necessary information to fulfill the request. The front end component 104 then sends a response to the black-box scanner 102. The resulting information, which is limited to the information sent through the HTTP interface, for example, the request, the response, and the time it took the system to send the response, is used by the tester to determine whether there are security vulnerabilities within the system.

For the above, a person of ordinary skill in the art would recognize that the protocol used for the connection between the separate components of the system would vary depending on what servers and applications are running on each component. For example, if the back end component comprised an application server that runs certain software applications, the protocol that can be used to connect the front end component to the back end component for communication purposes may be a .NET protocol. Whereas, if the back end component comprises a database server, the ODBC protocol or the Java Database Connectivity (JDBC) Application Programming Interface (API) may be used for communication between the components.

Figure 1B:
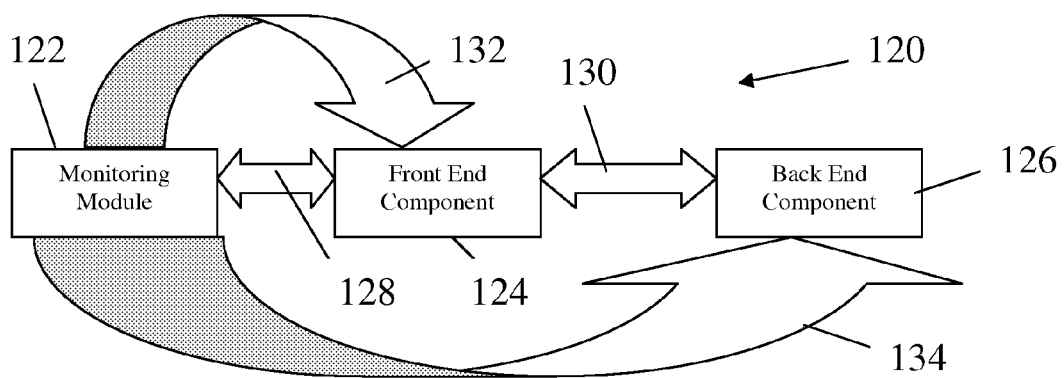
FIG. 1B is a high level diagrammatic representation of a system for detecting security vulnerabilities in a computing platform, in accordance with one embodiment of the invention.

One embodiment of the invention is illustrated in FIG. 1B, wherein the monitoring module 122 can perform black box testing by connecting to the front end component 124 through a communications protocol 128 such as HTTP, and also connects to the front end component 124 separately through a file system access 132, while also directly connecting to the back end component 126 through a server specific communications protocol 134. The monitoring module 122 communicates data with the front end component 124 (e.g. sends requests to and/or receives responses or data from the front end component) through the communications protocol 128, while monitoring the activities of both the front end 124 and the back end 126 components during the communication. The information received regarding the activities of the components during these communications is stored by the monitoring module 122 and used in determining or contribute to identifying whether there are security vulnerabilities within the system. As the information is received and stored, the type of testing, for example, but not limited to, malicious injection or valid/invalid input data, could be changed to suit the type of activities occurring on the front end 124 and back end 126 components. The resulting information can also be used by the tester in combination to determine what parts of the system are involved in the vulnerabilities. The results may also or alternatively be used to further define or influence the testing process.

The Monitoring Module

A monitoring module can comprise a single computing device, multiple interconnected computing devices, and/or one or more software/hardware modules provided on a single or multiple computing device(s), configured to check computer and/or network systems for problems, such as for example, but not limited to, failing systems, overloads, crashed systems, or failed connections.

It will be appreciated that while some embodiments of the inventions are described to comprise one or more first and second monitoring modules, such first and second monitoring modules may be integrated within a same module configured to provide complementary functions, or be provided by distinct modules. It will also be appreciated that additional monitoring modules distinct from, but possibly integrally operated with, first and second monitoring modules, may also be considered herein to provide additional, duplicative or supportive functions, without departing from the general scope and nature of the present disclosure.

For example, in one embodiment, the monitoring module can comprise a scanner configured to actively interact with applications on one or more front end or back end components. In another embodiment, the monitoring module can be remote or distinct from and communicatively linked to a scanner configured to actively interact with applications on one or more front end or back end components.

In one embodiment, the monitoring module is provided by one or more computing devices remote or distinct from the monitored system, for example wherein the monitoring module sends testing inputs to one or more remote or distinct computing devices running the application or applications being tested.

In another embodiment, the monitoring module is provided by one or more computing devices of the monitored system (i.e. system running the tested application), for example wherein the monitoring module sends testing outputs to one or more computing devices providing various testing inputs to the system.

In a further embodiment, the monitoring module is provided by one or more computing devices remote or distinct from and communicatively linked to the one or more computing devices running the application being tested and the one or more computing devices providing the testing inputs thereto.

Another type of problem that monitoring is used to check for is known as intrusion detection which is used to check for threats from outside sources, for example, but not limited to, users who are able to input invalid data into the system and manipulate the system, otherwise known as hackers. One example of how monitoring is used is website monitoring. Businesses can monitor their websites to ensure users are able to access their online applications and perform actions such as searching, online shopping, checking an account balance, or researching. Businesses also use monitoring to detect whether a user is attempting to access the website services in an abusive manner, e.g. intrusion detection.

Figure 2:
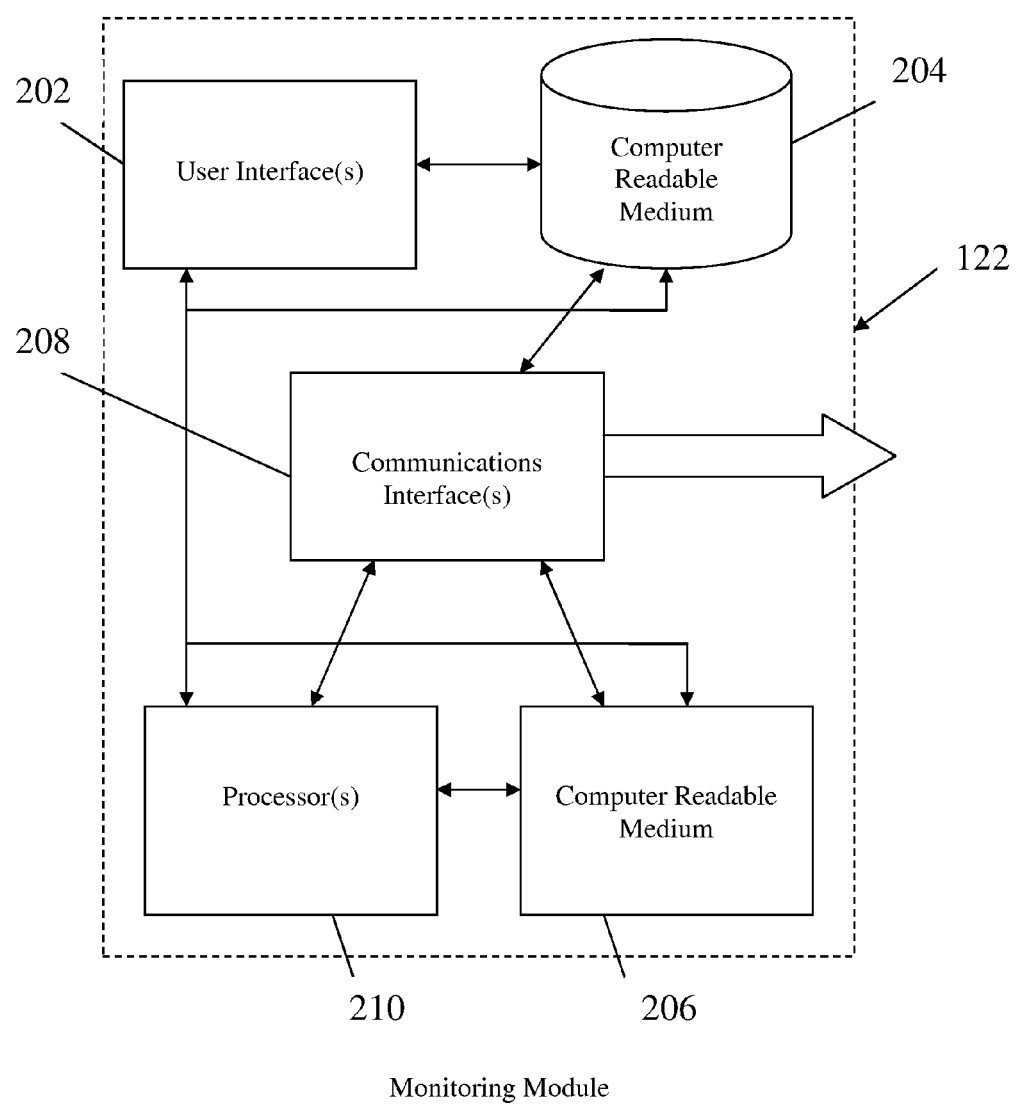
FIG. 2 is a high level diagrammatic representation of a monitoring module, in accordance with one embodiment of the invention.

With reference to FIG. 2, and in accordance with one embodiment of the invention, there is depicted a monitoring module 122. In this embodiment, the monitoring module generally comprises one or more user interfaces (UI) 202 such as a graphical user interface (GUI), keyboard, keypad, mouse, scroll ball or the like for receiving input from the user directed to the operation of the monitoring module 122, one or more computer readable media 204 and 206 for storing statements and instructions for the operation of the module, and optionally for storing various forms of data useful in the implementation of module functions and/or accessible to the user of the monitoring module 122 as needed, one or more processors 210 for processing sent and received information and for implementing statements and instructions stored on the one or more computer readable media 204 and 206, one or more communications interfaces 208 for interfacing with other components of the system, and optionally, for direct communication with other similarly configured monitoring modules. Other elements and/or components, as would be readily apparent to the person skilled in the art, may also be considered herein without departing from the general scope and nature of the present disclosure. For instance, various hardware, firmware and/or software may be integrated or operationally associated with a given monitoring module 122 to achieve various functions and interface with the user and/or various applications accessed thereby over a network. Also, various peripheral devices, such as supplemental user interfaces, data input and/or output means (e.g. printers, scanners, removable storage media, etc.), and the like may also be considered herein.

The monitoring module comprises one or more user interfaces (UI). A UI is a means by which users interact with a computing device and software applications existing on a computing device. The UI provides a means of allowing the user to manipulate a system through input, and allowing the system to produce the effects of the manipulation through output. Examples of a UI include, but are not limited to, a graphical user interface (GUI) which accepts input via devices such as computer keyboard or mouse, or by touch screen, and provide articulated graphical output on the computer monitor; or a web-based UI which accepts input and provides output by generating web pages which are transported via the Internet and viewed by the user using a web browser program.

The monitoring module comprises and/or is operatively coupled to one or more computer readable mediums. A computer readable medium is a computer component used to store data for some period of time. There are many different types of data storage that may be associated with a computing device, for example a computer readable medium may include a database used to store test data. A database is a structured collection of records or data that is stored in a computer so that a program can consult the records or data to answer queries. A database can be used, in the present invention, to store the data used to test the system, for example, but not limited to, different HTTP requests, e.g. GET, PUT, POST, DELETE, TRACE, etc. The user may access the database to add, change, or delete test cases. When the user begins a testing session, the processor can, either automatically or through a user request, access the database to send test cases over the network through the communications interface. Another example of a computer readable medium may include means for storing statements and instructions for the operation of the monitoring module, and optionally for storing various forms of data useful in the implementation of module functions which may be accessible to the user.

The monitoring module further comprises one or more processors for processing instructions and statements stored in a computer readable medium accessible by the processor. In one embodiment of the present invention, the processor may be configured to automatically run a testing session without user input. The processor may be configured to automatically extract the test data from the computer readable medium and input the data through the communications interface to the front end component. In another embodiment, the processor may require information from the user to select more specific testing data from the computer readable medium to be input to the front end component. For example, the user may need to select whether the type of test cases to be used is malicious injection or valid/invalid input test cases.

The monitoring module additionally comprises one or more communication interfaces. A communication interface is a point of interconnection between a computing device and a network or between two networks. The monitoring module can communicate through a communications interface, to the front end component and back end component during a testing session.

During a testing session in accordance with one embodiment of the invention, and with reference to FIG. 1B, the monitoring module 122 communicates with the front end component 124 through a communications protocol 128 such as HTTP as well as through a file system access connection 132, such as a Network File System (NFS) protocol. The front end component 124 communicates with the back end component 126 through a communications protocol 130, such as ODBC, while the monitoring module 122 communicates directly with the back end component 126 through a separate communications protocol 134, such as ODBC. As a person of ordinary skill in the art would recognize, the communications protocol 134 used to connect the monitoring module 122 to the back end component 126 typically depends on what type of server is running on the back end component 126, for example, but not limited to, a database server, an application server, a game server, etc., as described in more detail below. A file system access connection 132, such as NFS, is accomplished using a type of protocol that allows not only a communication connection between a client and server, e.g. the monitoring module 122 and the front end component 124, respectively, but allows the client (e.g. monitoring module 122) to access files on the server (e.g. front end component 124). A protocol like NFS is a type of protocol that allows a user on a client computer to access files over a network as easily as if the network devices were attached to its local disks.

The Front End Component

A front end component is a computing device where in the most general sense it is the initial stage of a process flow. The front end component is responsible for collecting input from the user, which can be in a variety of forms, and processing this input in such a way that it conforms to a specification or format that a back end component can use. A front end component is generally software that provides an interface to another program (e.g. the back end component) which may not be as user friendly and/or network accessible as the front end component. For example, but not limiting the scope of the invention, a graphical file manager, such as Windows Explorer, can be a front end component to a computer's file system, the back end component. Other configurations of the front end component would be readily understood by a worker skilled in the art.

Figure 3:
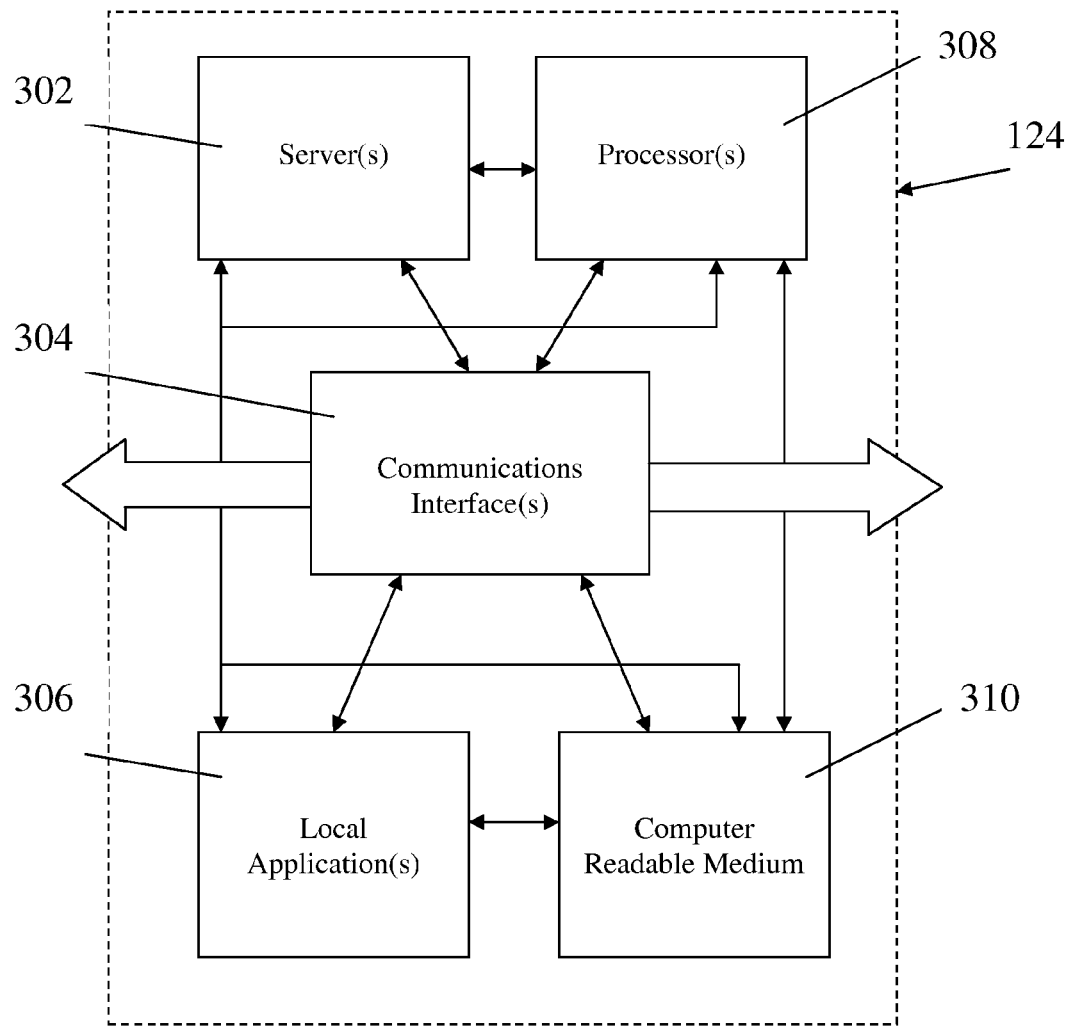
FIG. 3 is a high level diagrammatic representation of a front end component, in accordance with one embodiment of the invention.

With reference to FIG. 3, and in accordance with one embodiment of the invention, there is depicted a front end component 124. In this embodiment, the front end component 124 generally comprises one or more servers 302 such as, but not limited to a web server which provides services to programs and users either on the same computer or over a network, one or more computer readable media 310 for storing statements and instructions for the operation of the front end component 124 and optionally for storing various forms of data useful in the implementation of front end component functions. The front end component further comprises one or more processors 308 for processing sent and received information and for implementing statements and instructions stored on the one or more computer readable mediums 310 and one or more communications interfaces 304 for interfacing with other components of the system. The front end component additionally comprises one or more local applications 306 such as, but not limited to, word processors, spreadsheets, media players, etc. Other elements and/or components, as would be readily apparent to the person skilled in the art, may also be considered to be part of the front end component and are considered herein without departing from the general scope and nature of the present disclosure. For instance, various hardware, firmware and/or software may be integrated or operationally associated with a given front end component 124 to achieve various functions and interface with various applications accessed thereby over a network. Also, the front end component may comprise various peripheral devices, such as supplemental user interfaces, data input and/or output means (e.g. printers, scanners, removable storage media, etc.), and the like.

The front end component comprises one or more servers 302. A server is generally a computer or a computer program that provides services to other computers (e.g. clients) over a network. Servers are often physically similar to other general-purpose computers, although their hardware configurations may be particularly optimized to fit their server roles. There are many different types of servers which provide a variety of services to client computers. For example, a not limiting list of servers can include web servers which provide an interface between a client computer and a web application; file servers which store and provide access to various types of files to other clients on a network; and there are backup servers which have network backup software installed and have large amounts of hard drive storage or other forms of storage (e.g. tape, optical, magnetic drives, etc.) available to it to be used for the purpose of ensuring that data loss does not occur in the network, among others server configurations as would be readily understood.

The front end component comprises one or more local applications wherein a local application is a software application installed on a computing device, such as Microsoft Word, Excel, Access, or Adobe Acrobat, or the like that have access to local resources such as operating system functions, file information, database access, and file transfer capabilities, for example. A local application performs specific actions utilizing local system resources. For example, database queries or file transfers are common actions performed by a local application.

The front end component additionally comprises one or more computer readable mediums, wherein a computer readable medium is a type of computer data storage or computer memory, such as, but not limited to CD, RAM, EPROM, EEPROM, ROM, DVD, optical or magnetic drives, etc., or other computer readable media as would be readily understood by a worker skilled in the art.

The front end component comprises one or more processors. As described above, a processor is used for processing instructions and statements stored in a computer readable medium to which it is operatively coupled. A processor can be configured as a single central processing unit, a dual processor central processing unit or other processor format as would be readily understood by a worker skilled in the art.

One or more communication interfaces are operatively coupled with the front end component and can provide a point of interconnection between a computing device and a network or between two networks and can enable the transfer of data therebetween. Configurations of a communication interface would be readily understood by a worker skilled in the art, for example.

An embodiment of a front end component 124, in accordance with the invention is illustrated in FIG. 3 and comprises a server 302, such as a Web server which stores Hypertext Markup Language (HTML) documents, images, text files, scripts, and other Web related data or content, and distributes the content to other clients on the network on request; computer readable medium 310, such as memory to store data and/or instructions, such as test input and test output, received by the front end component 124 from the monitoring module 122 and/or the back end component 126; a processor 308, for processing the data and/or instructions from the monitoring module 122 into instructions readable and executable by the back end component 126; a communications interface 304, such as HTTP to communicate with the monitoring module 122, and/or an ODBC protocol to communicate with the back end component 126; a local application 306, such as Microsoft Word which may be used to convert the resulting output from the back end component 126 into user friendly output to be sent to the monitoring module 122 and analyzed by the user.

In one embodiment of the invention, the front end component is configured as a single computing device to provide the functionality of the front end component, which can perform functions including communication with the monitoring module and back end component among other functions.

In another embodiment of the invention, the front end component comprises two or more computing devices, which interconnected and configured to provide the functionality of the front end component, which can perform functions including communication with the monitoring module and back end component among other functions. In a multi-computing device configuration of the front end component, specific functions of the front end component can be performed by a specific computing device or the functionality of the front end component can be enabled in a dynamic manner based on computing capacity and task load of each of the multiple computing devices. For example, when a specific task is required an allocation system can send this specific task to the computing device which has the least number of tasks to perform. In this manner the desired task can typically be performed in a more efficient manner, when compared to dedicated computing device functionality. In one embodiment of the invention, the dynamic allocation of task for the front end component can be enabled using Dynamic Server Allocation (DSA) or other dynamic allocation configuration as would be known to a worker skilled in the art.

The Back End Component

A back end component is a computing device where in the most general sense it is the end stage of a process flow. The back end component is responsible for executing statements and/or instructions received by the back end component from one or more front end components or from other back end components (e.g. in a multi-tier application), and returning an output to the front end or other back end components. In most cases, the back end component is hidden from the user, often because the back end component is not configured to be user friendly. The back end component thus communicates its results to the front end (i.e. either directly or via one or more intermediary back end components) which subsequently converts this information into a more user friendly format. For example, but not limiting the scope of the present invention, an SQL server is often part of a back end component because it contains a large amount of data which requires a considerable amount of memory to store the data, an SQL server does not comprise a user friendly UI, and it is often important to keep the data stored in the SQL database private. By keeping the data stored on a back end component, there is a level of separation between a user and the stored data, e.g. the front end component.

Figure 4:
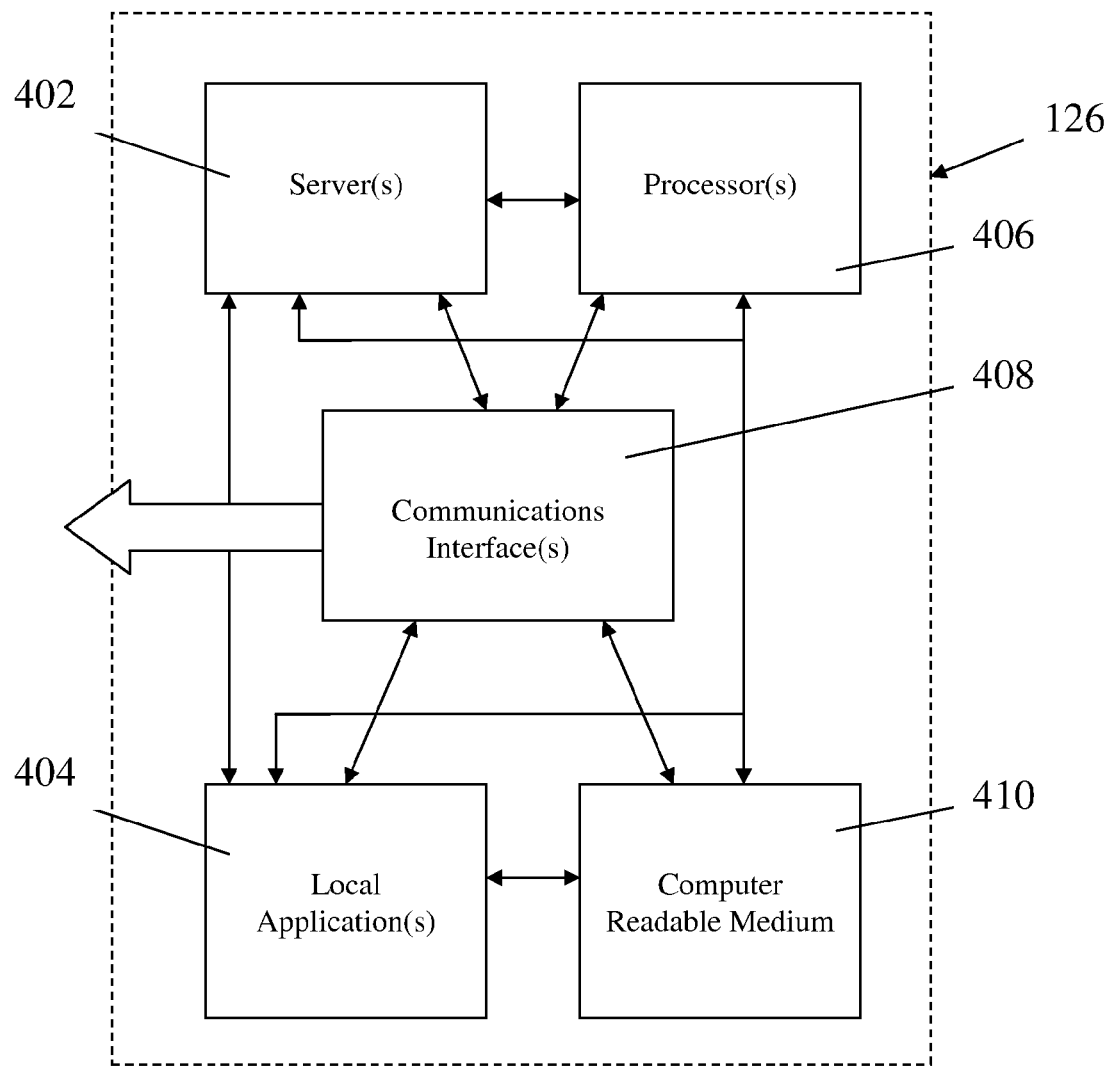
FIG. 4 is a high level diagrammatic representation of a back end component, in accordance with one embodiment of the invention.

With reference to FIG. 4, and in accordance with one embodiment of the invention, there is depicted a back end component 126. In this embodiment, the back end component generally comprises one or more servers 402 such as, but not limited to a database server which is a computer program that provides database services to other computer programs and/or computers, one or more computer readable mediums 410 for storing statements and instructions for the operation of the back end component 126 and optionally for storing various forms of data useful in the implementation of back end component functions. The back end component further comprises one or more processors 406 for processing received and sent information and for implementing statements and instructions stored on the one or more computer readable medium 410 and one or more communication interfaces 408 for interfacing with other components of the system, and one or more local applications 404 such as, but not limited to, word processors, spreadsheets, media players, etc. Other elements and/or components, as would be readily apparent to the person skilled in the art, may also be considered herein without departing from the general scope and nature of the present disclosure. For instance, various hardware, firmware and/or software may be integrated or operationally associated with a given back end component 126 to achieve various functions and interface with various applications accessed thereby over a network. Also, various peripheral devices, such as supplemental user interfaces, data input and/or output means (e.g. printers, scanners, removable storage media, etc.), and the like may also be considered herein.

The back end component comprises one or more servers, wherein a server is generally a computer or computer program configured to provide services to other computers over a network. The back end component may comprise of one or more servers, such servers may include, but are not limited to, print servers which control and manage one or more printers and accept print jobs from other network clients, spooling the print jobs, and performing most or all of the other functions that a workstation would perform to accomplish a printing task if the printer were connected directly to the workstation's printer port; mail servers which store, send, receive, route, and perform other email related operations for other clients on the network; fax servers which store, send, receive, route, and perform other functions necessary for the proper transmission, reception, and distribution of faxes; telephony servers which perform telephony related functions such as answering calls automatically, performing the functions of an interactive voice response system, storing and serving voice mail, routing calls between the Public Switched Telephone Network (PSTN) and the network or the Internet (e.g. Voice over IP (VoIP) gateway), etc.; proxy servers which perform some type of function on behalf of other clients on the network to increase the performance of certain operations (e.g. pre-fetching and caching documents or other data that are requested very frequently) or as a security precaution to isolate network clients from external threats; application servers which perform the data processing or business logic portion of a client application, accepting instructions for operations to perform from a workstation and serving the results back to the workstation, while the workstation performs the UI or GUI portion of the processing (e.g. the presentation logic) that is required for the application to work properly; or game servers which are dedicated computer systems running game hosting software.

The back end component further comprises one or more local applications wherein a local application can be a software application installed on a computing device, such as Microsoft Word, Excel, Access, or Adobe Acrobat, or the like that have access to local resources such as operating system functions, file information, database access, and file transfer capabilities.

The back end component additionally comprises one or more computer readable mediums, wherein a computer readable medium is a type of computer data storage or computer memory, such as, but not limited to CD, RAM, EPROM, EEPROM, ROM, DVD, optical or magnetic drives, etc., or other computer readable media as would be readily understood by a worker skilled in the art.

The back end component comprises one or more processors which can be used for processing instructions and statements stored in a computer readable medium to which it is operatively coupled. A processor can be configured as a single central processing unit, a dual processor central processing unit or other processor format as would be readily understood by a worker skilled in the art.

One or more communication interfaces are operatively coupled with the back end component and provide a point of interconnection between a computing device and a network or between two networks and can enable the transfer of data therebetween. Configurations of a communication interface would be readily understood by a worker skilled in the art, for example FIG. 4 illustrates a back end component 126, in accordance with an embodiment of the invention. The back end component comprises a server 402, such as an SQL database server which stores data in a database, and can answer inquiries on request from other clients on the network regarding the stored data; computer readable medium 410, such as memory to store data and/or instructions, such as the data stored in the database, or for storing instructions received from the front end component 124; a processor 406, for processing and executing the instructions from the front end component 124; a communications interface 408, such as an ODBC protocol to communicate with the front end component 124; a local application 404, such as Microsoft Excel which may be used to convert the resulting output from the SQL database retrieved data into output to be sent to the front end component 124, to be finally sent to the monitoring module 122.

In one embodiment of the invention, the back end component is configured as a single computing device to provide the functionality of the back end component, which can perform functions including communication with front end component among other functions.

In another embodiment of the invention, the back end component comprises two or more computing devices, which interconnected and configured to provide the functionality of the back end component, which can perform functions including communication with the front end component among other functions. In a multi-computing device configuration of the back end component, specific functions of the back end component can be performed by a specific computing device or the functionality of the back end component can be enabled in a dynamic manner based on computing capacity and task load of each of the multiple computing devices. For example, when a specific task is required an allocation system can send this specific task to the computing device which has the least number of tasks to perform. In this manner the desired task can typically be performed in a more efficient manner, when compared to dedicated computing device functionality. In one embodiment of the invention, the dynamic allocation of task for the front end component can be enabled using Dynamic Server Allocation (DSA) or other dynamic allocation configuration as would be known to a worker skilled in the art.

Exemplary Testing Sessions

In one embodiment, the monitoring module is configured to perform one or more test sampling sessions in order to collect information which is indicative of the operation of the computing platform and can further provide for the evaluation of a vulnerability assessment of the computing platform.

In another embodiment, a test sampling session can be configured as a predetermined series of queries presented to the computing platform, the results and actions of which can be collected and correlated to perform the vulnerability assessment.

In another embodiment, a test sampling session is a dynamic sampling session, wherein the responses and actions of the computing platform to one or more specific queries can be used to determine subsequent queries for the computing platform. In this manner the test sampling session can be dynamically modified in order to evaluate the computing platform in an efficient manner.

In a further embodiment, a testing session is provided through responding to events in the system. For example, rather than data being input into the system and waiting to see if the correct response is provided as output (e.g. test sampling session), the monitoring module receives output from the monitored system while it is running one or more applications. According to this embodiment, data is pushed to the monitoring module rather than being pulled thereby through sampling.

It will be appreciated by the person skilled in the art that other such testing sessions may be considered herein without departing from the general scope and nature of the present disclosure.

Example 1

Testing Web Application Vulnerabilities While Accessing a Database

Figure 5A:
FIG. 5A is a high level diagram depicting an embodiment of the system of FIG. 1A.
Figure 5B:
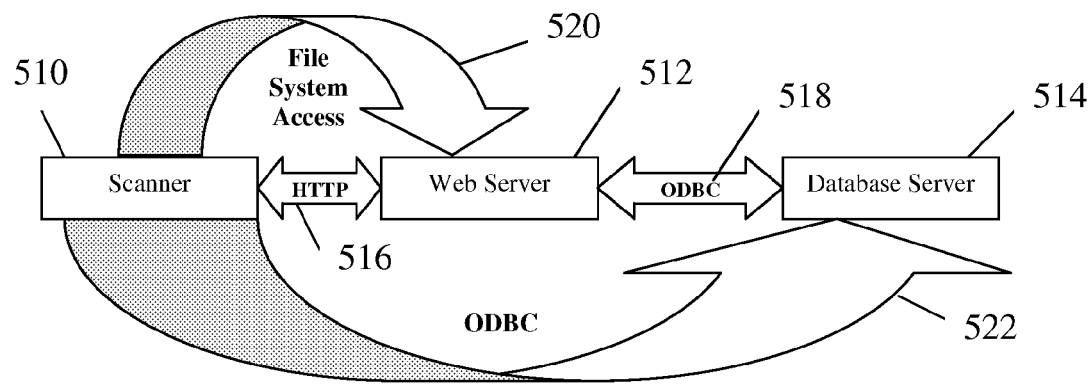
FIG. 5B is a high level diagram depicting an embodiment of the system of FIG. 1B.

In accordance with one embodiment of the invention and with reference to FIG. 5B, there is depicted an implementation of the invention. In this embodiment, a monitoring module, in this embodiment implemented by scanner 510, is configured to run a test session on a front end web application, i.e. run by web server 512, that may communicate with a back end SQL database, i.e. run and maintained by database server 514. While the monitoring module 510 establishes a communication link 516 with the front end web server 512 via HTTP, the monitoring module 510 establishes a separate connection 520 with the front end web server 512 via file system access connection, such as NFS protocol, to extract information from the web server 512 regarding the activities of the web server 512 while the testing session is in progress. The front end web server 512 establishes a communication link 518 with the back end SQL server 514 via ODBC to allow the web application 512 access to the SQL database 514 to execute the HTTP requests received by the web application 512 from the monitoring module 510. While the monitoring module 510 inputs test data to the front end web application 512, the monitoring module 510 establishes a communication link 522 to the back end SQL server 514 via ODBC to monitor the activities of the SQL server 514 during the testing session.

In one embodiment, the monitoring of the back end SQL server 514 may be accomplished through a SQL Server tool, for example, the SQL Profiler. In another embodiment, the monitoring of the back end SQL server may be accomplished through embedding software on the SQL server, that is designed to monitor the activity of the SQL server, for example, logging the activity of the server, and send the information to the monitoring module 510

During the testing session, the monitoring module 510 sends HTTP requests through the front end web application 512 requesting information from or requesting data to be added to the data in the back end SQL database 514. The monitoring module 510 comprises test data that it uses as input to the front end web application 512; this test data may include such HTTP requests as malicious SQL statements,
valid/invalid inputs, etc. When a HTTP request is sent to the SQL server 514, all the SQL activity that occurs in the database during that request is collected and sent to the monitoring module 510 and is stored in memory, as a "log". If the test data, e.g. malicious SQL statements, is seen in the stored database activity log, this means the web application 512 is vulnerable to SQL injection. When the tester sees the invalid SQL statements in the database activity log, the tester is able to recognize the problem and where the problem may be occurring. Whereas, if the tester did not have the database activity log, the tester may only see a generic error message as output from the testing session.

It will be appreciated by the person skilled in the art that the monitoring module may be distinct from one or both the scanner 510 and a system implementing the application (e.g. web server 512), or again implemented locally by a same computing platform as that used to run the application. For example, in one embodiment, monitoring of the file system 520 on the front-end server 512 may be done remotely, accomplished, for example, via the NFS protocol (e.g. as described above).

In another embodiment, monitoring is done using a locally implemented monitoring module (e.g. implemented locally by the Web server 512), which communicates with the scanner 510 remotely. In this embodiment, the locally installed monitoring module can, for example, be used to gather information not available through the NFS protocol. For instance, while the NFS protocol can be limited to locking, adding, removing or editing files, a locally installed monitoring module may be able to monitor various attempts performed by the web server 512 to read files from the system, whether successful or not. For example, an attempt to read a file whose name includes one of the inputs intentionally injected through the HTTP interface can indicate the server is susceptible to a vulnerability allowing file tampering or access to unauthorized information by reading the contents of files on the server. While the HTTP interface may return a generic error message in such situations, the technique described herein may be used to uncover this vulnerability.

Example 2

Figure 6:
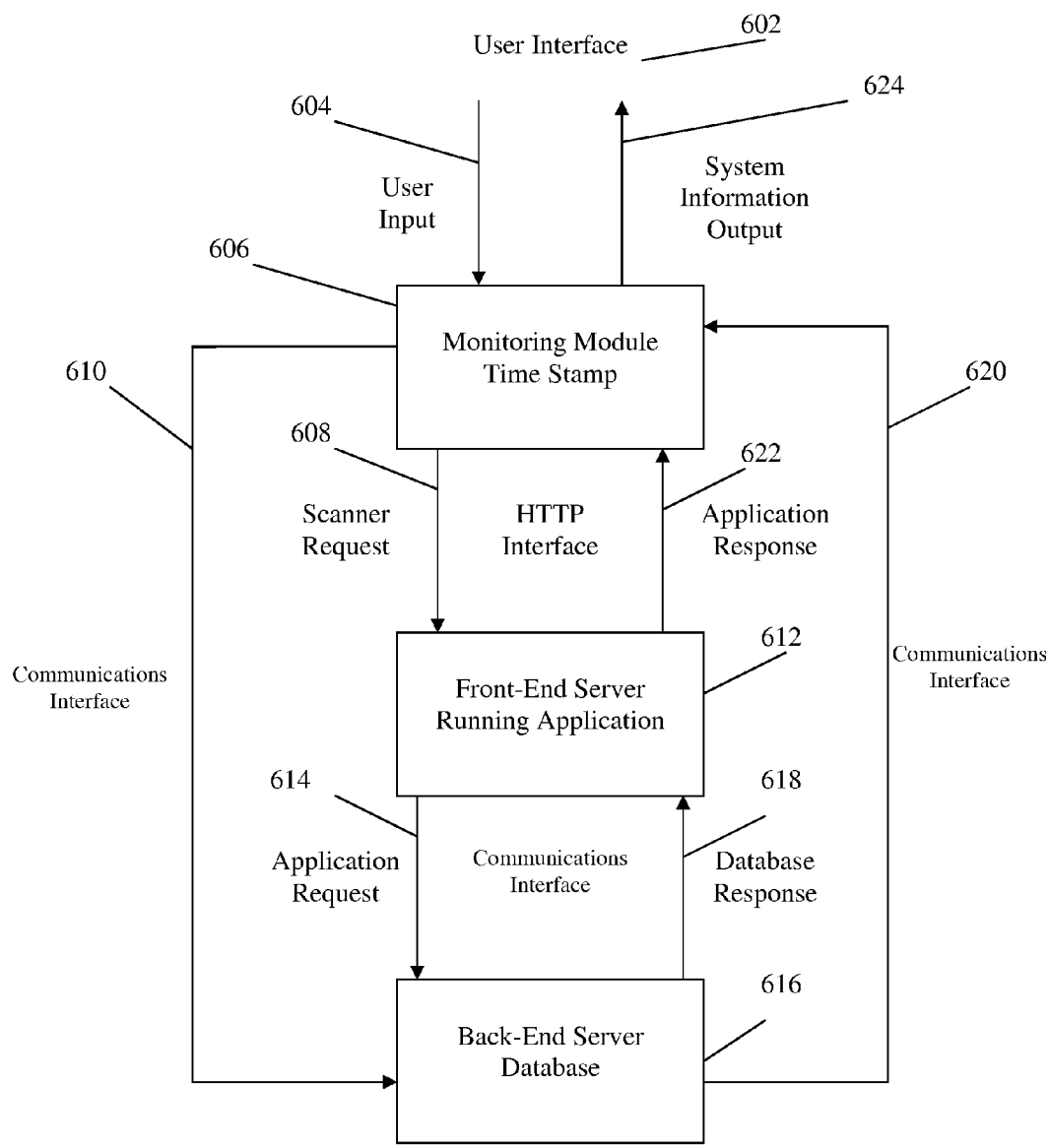
FIG. 6 is a flow diagram depicting a testing process, in accordance with one embodiment of the invention.

Web Application Testing Process for Testing Vulnerabilities While Accessing a Database In accordance with one embodiment of the invention and with reference to FIG. 6, a monitoring module 606 receives user input 604 from a user interface 602, and time stamps when the information is received. The user input 604 is then used to send a HTTP request (e.g. scanner request) 608 to a front-end application server 612 to request the application to take in the user input 604 and produce some result. The monitoring module 606 also sends a communications request through the communications interface 610 to a back-end server 616 operatively coupled to the front-end server 612.

The front-end application server 612 interprets the HTTP request 608 to provide an application request 614 in a format the back-end server 616 can understand, and requests the information from the back-end server 616. The back-end server 616 searches for the requested information and provides the information to the front-end application server 612 (via database response 618) in a format understood by the front-end server 612. The front-end server 618 then communicates the information received from the back-end server 616 to the monitoring module 606 using the HTTP interface (e.g. via application response 622). While the back-end server 616 is processing the information from the front-end server

618, responsive to the communications request 610, the monitoring module 606 also receives data through the communications interface 620 indicative of back-end server activity during the sampling process. The monitoring module displays (or otherwise manages) the received system information output 624 to the user through the user interface.

It is clear that the described embodiments of the invention are exemplary and can be varied in many ways. Such variations are not to be regarded as a departure from the spirit and scope of the invention, and all such variations, as would be obvious in the art, are intended to be included within the scope of the following claims.

We claim:

1. A system for detecting security vulnerabilities in a computing platform, the computing platform comprising one or more front end components which provide services to other applications or users, and one or more back end components which supply required information to the one or more front end components to fulfill the services, the system comprising:
   one or more first monitoring modules communicatively linked to the one or more front end components, and operatively configured to monitor the one or more front end components while communicating data with the one or more front end components;
   one or more second monitoring modules communicatively linked to the one or more back end components, and operatively configured to monitor the one or more back end components while the one or more back end components supply required information to the one or more front end components;
   wherein the one or more first monitoring modules is further operatively configured to communicate data of a testing type with the one or more front end components via a communication protocol and monitors activities of the one or more front end components via a protocol other than the communication protocol while communicating the data with the one or more front end components, while the one or more second monitoring modules monitor activities of the one or more back end components responsive to communicating the data;
   wherein information extracted that is associated with the activities of the one or more front end components is combinable with information extracted that is associated with the activities of the one or more back end components to contribute to identification of one or more security vulnerabilities within the computing platform;
   wherein at least one of the one or more first monitoring modules and the one or more second monitoring modules further operatively configured to combine and store all of the information extracted that is associated with the activities of the one or more front end components and all of the information extracted that is associated with the activities of the one or more back end components in an activity log; and
   at least one of the one or more first monitoring modules and the one or more second monitoring modules further operatively configured to change the testing type to suit the activities of at least one of the one or more front end components and the activities of the one or more back end components based on the combined information stored in the activity log.

2. The system as claimed in claim 1, wherein the testing type is selected from a group consisting of malicious injection and valid/invalid input data.

3. The system as claimed in claim 1, wherein the one or more back end components is operatively configured to supply additional services to one or more additional back end components in a multi-tier application.

4. The system as claimed in claim 1, wherein the one or more first monitoring modules comprise a scanner for communicating data with the one or more front end components.

5. The system of claim 1, wherein the one or more first monitoring modules operatively configured to receive pushed output data from the one or more front end components while monitoring the one or more front end components.

6. The system of claim 1, wherein the one or more first monitoring modules is operatively configured to send data requests to and is operatively configured to receive responses from the one or more front end components while monitoring the one or more front end components.

7. The system as claimed in claim 1, wherein the one or more first monitoring modules and the one or more second monitoring modules are implemented via distinct computing platforms.

8. The system as claimed in claim 1, wherein the one or more first monitoring modules and the one or more second monitoring modules are implemented via a common computing platform.

9. The system as claimed in claim 1, wherein the one or more second monitoring modules is operatively configured to interface with the one or more back end components via one or more application-specific protocols.

10. The system as claimed in claim 9, wherein the one or more application-specific protocols comprises at least one of an Open Database Connectivity (ODBC) protocol, a .NET protocol, and a Java Database Connectivity (JDBC) Application Programming Interface (API) protocol.

11. The system as claimed in claim 1, wherein the communication protocol comprises a Hypertext Transfer Protocol (HTTP) for communicating the data with the one or more front end components, and wherein the protocol other than the communication protocol comprises at least one of a File System Access protocol and a Network File System (NFS) protocol to monitor the one or more front end components.

12. A method of detecting security vulnerabilities in a computing platform, the computing platform comprising one or more front end components which provide services to other applications or users, and one or more back end components which supply required information to the one or more front end components to fulfill the services, the method comprising:
   connecting to the one or more front end components via one or more front end communication protocol connections;
   connecting to the one or more back end components using one or more application-specific protocol connections for communicating with an application;
   communicating data of a testing type with the one or more front end components via the one or more communication protocol connections;
   monitoring activities of the one or more front end components via one or more protocol connections other than the one or more communication protocol connections while communicating the data with the one or more front end components;
   monitoring activities of the one or more back end components responsive to communicating the data;
   extracting activity information from the one or more front end components and from the one or more back end components, wherein information extracted that is associated with the activities of the one or more front end components is combinable with information extracted that is associated with the activities of the one or more back end components to contribute to identification of one or more security vulnerabilities within the computing platform;

combining and storing all of the information extracted that is associated with the activities of the one or more front end components and all of the information extracted that is associated with the activities of the one or more back end components in an activity log; and changing the testing type to suit the activities of at least one of the one or more front end components and the activities of the one or more back end components based on the combined information stored in the activity log.

13. The method of claim 12, wherein communicating the data with the one or more front end components comprises receiving pushed output data from the one or more front end components.

14. The method of claim 12, wherein communicating the data with the one or more front end components comprises sending one or more data requests to and receiving one or more responses from the one or more front end components.

15. The method of claim 12, wherein communicating the data with the one or more front end components is implemented by one or more scanners communicatively linked to the one or more front end components.

16. The method of claim 12, wherein the one or more communication protocol connections is implemented via at least one Hypertext Transfer Protocol (HTTP) connection and wherein the protocol other than the one or more communication protocol connections is implemented via one or more separate protocol connections.

17. The method of claim 16, wherein the one or more separate protocol connections comprises at least one of a File System Access connection and a Network File System (NFS) connection.

18. The method of claim 12, wherein the one or more protocol connections other than the one or more communication protocol connections comprises at least one of an Open Database Connectivity (ODBC) connection, a .NET connection, and a Java Database Connectivity (JDBC) Application Programming Interface (API) connection.

19. A non-transitory computer readable medium having recorded thereon statements and instructions for execution by a computer for detecting security vulnerabilities in a computing platform, the computing platform comprising one or more front end components which provide services to other applications or users, and one or more back end components which supply required information to the one or more front end components to fulfill the services, by carrying out operations comprising:

connecting to the one or more front end components;
connecting to the one or more back end components;
communicating data of a testing type with the one or more front end components via a communication protocol;
monitoring activities of the one or more front end components via a protocol other than the communication protocol while communicating the data with the one or more front end components;
monitoring activities of the one or more back end components responsive to communicating the data;
extracting activity information from the one or more front end components and from the one or more back end components, wherein information extracted that is associated with the activities of the one or more front end components is combinable with information extracted that is associated with the activities of the one or more back end components to contribute to identification of one or more security vulnerabilities within the computing platform;
combining and storing all of the information extracted that is associated with the activities of the one or more front end components and all of the information extracted that is associated with the activities of the one or more back end components in an activity log; and
changing the testing type to suit the activities of at least one of the one or more front end components and the activities of the one or more back end components based on the combined information stored in the activity log.

20. The non-transitory computer-readable medium of claim 19, wherein communicating the data with the one or more front end components is implemented by one or more scanners communicatively linked to the one or more front end components.

21. The non-transitory computer-readable medium of claim 19, wherein the communication protocol is implemented via a Hypertext Transfer Protocol (HTTP) connection and wherein the protocol other than the communication protocol is implemented via a separate protocol connection.

22. The non-transitory computer-readable medium of claim 19, wherein the protocol other than the communication protocol is implemented via at least one of a File System Access protocol connection and a Network File System (NFS) protocol connection.

23. The non-transitory computer-readable medium of claim 19, wherein the protocol other than the communication protocol is implemented via at least one of an Open Database Connectivity (ODBC) connection, a .NET connection, and a Java Database Connectivity (JDBC) Application Programming Interface (API) connection.

24. The non-transitory computer-readable medium of claim 19, wherein communicating the data with the one or more front end components comprises receiving pushed output data from the one or more front end components.

25. The non-transitory computer-readable medium of claim 19, wherein communicating the data with the one or more front end components comprises sending one or more data requests to and receiving one or more responses from the one or more front end components.

* * * * *